(12) United States Patent
Lavie et al.

(10) Patent No.: US 10,657,598 B2
(45) Date of Patent: May 19, 2020

(54) SYSTEM AND METHOD FOR USE OF CARBON EMISSIONS IN CHARACTERIZING DRIVER PERFORMANCE

(71) Applicant: Scope Technologies Holdings Limited, Johannesburg (ZA)

(72) Inventors: Samuel Lavie, Johannesburg (ZA); Johann Van den Bergh, Johannesburg (ZA); Gil Fuchs, Nes Tziona (IL); Friedl Jacobs, Johannesburg (ZA)

(73) Assignee: Scope Technologies Holdings Limited, Tortola (VG)

( * ) Notice: Subject to any disclaimer, the term of this patent is extended or adjusted under 35 U.S.C. 154(b) by 0 days.

(21) Appl. No.: 13/860,284

(22) Filed: Apr. 10, 2013

(65) Prior Publication Data

US 2014/0180726 A1  Jun. 26, 2014

Related U.S. Application Data

(60) Provisional application No. 61/740,290, filed on Dec. 20, 2012.

(51) Int. Cl.
  *G06F 17/28* (2006.01)
  *G06Q 40/08* (2012.01)

(52) U.S. Cl.
  CPC .................................. *G06Q 40/08* (2013.01)

(58) Field of Classification Search
  CPC ..................................................... G06Q 40/08
  (Continued)

(56) References Cited

U.S. PATENT DOCUMENTS

| 4,638,289 A | 1/1987 | Zottnik |
| 4,758,959 A | 7/1988 | Thoone |

(Continued)

FOREIGN PATENT DOCUMENTS

| CN | 102436738 A | 5/2012 |
| WO | 2011003461 A1 | 1/2011 |

(Continued)

OTHER PUBLICATIONS

European Search Report dated May 4, 2015, issued in connection with EP12860238.0.

(Continued)

*Primary Examiner* — Bennett M Sigmond
*Assistant Examiner* — Michael D Cranford
(74) *Attorney, Agent, or Firm* — Downs Rachlin Martin PLLC

(57) ABSTRACT

A system and method for use of carbon emissions in characterizing driver performance and using such characterization to determine a profile/score associated with a particular insured. The profile/score can then be used to determine an insurance premium for the insured. In accordance with an embodiment, a driver can use a portable device equipped with a data collection and assessment environment, including one or more data collection devices that can be used to capture data and information or otherwise measure the carbon emissions associated with a vehicle. A framework (system) can receive information about the driver's driving profile, and use this information either to determine an insurance quote, or act as a broker/aggregator in inviting other insurance providers to offer an insurance quote, or usage based insurance quote (UBI).

7 Claims, 4 Drawing Sheets

(58) Field of Classification Search
USPC .......................................................... 705/4
See application file for complete search history.

(56) References Cited

U.S. PATENT DOCUMENTS

| | | |
|---|---|---|
| 6,282,496 B1 | 8/2001 | Chowdhary |
| 7,389,178 B2 | 6/2008 | Raz et al. |
| 7,643,960 B2 | 1/2010 | Tan et al. |
| 7,653,507 B2 | 1/2010 | Yamada |
| 7,715,961 B1 | 5/2010 | Kargupta |
| 7,761,544 B2 | 7/2010 | Manasseh et al. |
| 8,065,104 B2 | 11/2011 | Fiedler |
| 8,229,624 B2 | 7/2012 | Breed |
| 8,595,034 B2 | 11/2013 | Bauer et al. |
| 8,825,277 B2 | 9/2014 | McClellan et al. |
| 8,930,044 B1 | 1/2015 | Peeters et al. |
| 9,020,751 B1 | 4/2015 | Bogovich et al. |
| 2002/0111725 A1 | 8/2002 | Burge |
| 2003/0095038 A1 | 5/2003 | Dix |
| 2004/0153362 A1 | 8/2004 | Bauer |
| 2005/0046584 A1 | 3/2005 | Breed |
| 2005/0116829 A1 | 6/2005 | Koenig et al. |
| 2005/0131597 A1 | 6/2005 | Raz |
| 2006/0092043 A1 | 5/2006 | Lagassey |
| 2006/0092890 A1 | 5/2006 | Gupta et al. |
| 2006/0241853 A1 | 10/2006 | Gadler |
| 2007/0061155 A1 | 3/2007 | Ji et al. |
| 2007/0159309 A1 | 7/2007 | Ito |
| 2008/0157940 A1 | 7/2008 | Breed et al. |
| 2008/0262670 A1 | 10/2008 | McClellan et al. |
| 2009/0210257 A1 | 8/2009 | Chalfant |
| 2010/0063850 A1 | 3/2010 | Daniel |
| 2010/0087985 A1 | 4/2010 | Boss et al. |
| 2010/0131304 A1 | 5/2010 | Collopy et al. |
| 2010/0238009 A1 | 9/2010 | Cook et al. |
| 2010/0299017 A1 | 11/2010 | Hansen et al. |
| 2010/0305805 A1 | 12/2010 | Yamaguchi |
| 2011/0046842 A1 | 2/2011 | Smith |
| 2011/0102156 A1 | 5/2011 | Gravelle et al. |
| 2011/0106370 A1 | 5/2011 | Duddle |
| 2011/0147513 A1 | 6/2011 | Surmont |
| 2011/0202305 A1 | 8/2011 | Willis |
| 2011/0213628 A1 | 9/2011 | Peak et al. |
| 2011/0224868 A1 | 9/2011 | Collings, III et al. |
| 2011/0307188 A1 | 12/2011 | Peng et al. |
| 2011/0313650 A1 | 12/2011 | Tomé |
| 2012/0010906 A1 | 1/2012 | Foladare et al. |
| 2012/0018989 A1 | 1/2012 | Breed |
| 2012/0072244 A1* | 3/2012 | Collins et al. ................... 705/4 |
| 2012/0076437 A1 | 3/2012 | King |
| 2012/0078472 A1 | 3/2012 | Neal et al. |
| 2012/0089299 A1 | 4/2012 | Breed |
| 2012/0105241 A1 | 5/2012 | Griffin et al. |
| 2012/0123806 A1 | 5/2012 | Schumann, Jr. et al. |
| 2012/0166035 A1 | 6/2012 | Boss |
| 2012/0173444 A1* | 7/2012 | Zik ............................... 705/317 |
| 2012/0232787 A1 | 9/2012 | Kunath et al. |
| 2013/0040599 A1 | 2/2013 | Berg et al. |
| 2013/0041521 A1 | 2/2013 | Basir |
| 2013/0046562 A1 | 2/2013 | Taylor et al. |
| 2013/0060583 A1 | 3/2013 | Collins et al. |
| 2013/0144474 A1 | 6/2013 | Ricci |
| 2014/0279707 A1 | 9/2014 | Joshua et al. |
| 2014/0297058 A1 | 10/2014 | Barker et al. |
| 2014/0358326 A1 | 12/2014 | Phelan et al. |
| 2014/0358362 A1 | 12/2014 | Breed |

FOREIGN PATENT DOCUMENTS

| | | |
|---|---|---|
| WO | 2014080388 A2 | 5/2014 |
| WO | 2014159127 A1 | 10/2014 |

OTHER PUBLICATIONS

European Examination Report dated Feb. 9, 2016, issued in connection with EP12860238.0.

Copernheaver, Blaine, PCT International Search Report for PCTUS2016/015514, dated Jun. 20, 2016.

International Searching Authority, International Search Report and Written Opinion for PCT International Application No. PCT/US2012/071487, dated Apr. 19, 2013, 14 pages.

EPO Result of Consultation dated Nov. 8, 2017, in connection with EP 12860238.0.

Hon Lung Chu et al. "Poster: You Driving? Talk to You Later", Mobisys '11, ACM, US, Jul. 1, 2011, pp. 397-398, XP058004607, DOI: 10.1145/1999995.2000054, ISBN:978-1-4503-0643-0.

G. Stein et al. "Compact Vibration Measuring System for ini-vehicle Applications", Measurement Science Review, vol. 11, No. 5, Oct. 29, 2011, XP055421653, DOI: 10.2478/v10048-011-0030-1.

* cited by examiner

SYSTEM AND METHOD FOR USE OF CARBON EMISSIONS IN CHARACTERIZING DRIVER PERFORMANCE

CLAIM OF PRIORITY

This application claims the benefit of priority to U.S. Provisional Patent Application No. 61/740,290, filed Dec. 20, 2012; and is related to U.S. patent application titled "SYSTEM AND METHOD FOR USE OF PATTERN RECOGNITION IN ASSESSING OR MONITORING VEHICLE STATUS OR OPERATOR DRIVING BEHAVIOR"; application Ser. No. 13/679,722, filed Nov. 16, 2012, which claims the benefit of priority to U.S. Provisional Patent Application No. 61/578,511, filed Dec. 21, 2011; U.S. patent application titled "SYSTEM AND METHOD FOR USE WITH AN ACCELEROMETER TO DETERMINE A FRAME OF REFERENCE"; application Ser. No. 13/679,749, filed Nov. 16, 2012, which claims the benefit of priority to U.S. Provisional Patent Application No. 61/616,722, filed Mar. 28, 2012; and U.S. patent application titled "SYSTEM AND METHOD FOR CHARACTERIZING DRIVER PERFORMANCE AND USE IN DETERMINING INSURANCE COVERAGE"; application Ser. No. 13/679,771, filed Nov. 16, 2012, which claims the benefit of priority to U.S. Provisional Patent Application No. 61/652,017, filed May 25, 2012; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to telematics and related technologies, and are particularly related to a system and method for use of carbon emissions in characterizing driver performance and its use in determining insurance coverage.

BACKGROUND

Every time a fossil fuel such as gasoline, coal or oil, is burned, combustion gases including carbon monoxide and carbon dioxide are released into the atmosphere as carbon emissions. A common source of carbon emissions, particularly in urban areas, are automobiles and other vehicles. The amount of carbon emissions a particular vehicle generates is dependent on a variety of factors, such as the type of vehicle and its overall condition, environmental conditions, and the manner in which the vehicle is operated. For example, a vehicle driven at high speeds may generate more emissions than a vehicle driven at moderate speeds.

Information about a vehicle, together with its driver, also has a bearing on factors such as liability insurance. For example, heavily-used vehicles are on the road more often, which means they potentially have more exposure to accidents. Additionally, certain drivers may have driving habits that are considered less safe than others. Information about these and other factors is useful when formulating insurance quotes for a particular vehicle or driver.

SUMMARY

Described herein is a system and method for use of carbon emissions in characterizing driver performance and using such characterization to determine a profile associated with a particular insured. The profile can then be used to determine an insurance premium for the insured. In accordance with an embodiment, a driver can use a portable device equipped with a data collection and assessment environment, including one or more data collection devices that can be used to capture data and information or otherwise measure the carbon emissions associated with a vehicle. A framework (system) can receive information about the driver's driving profile, and use this information either to determine an insurance quote, or act as a broker/aggregator in inviting other insurance providers to offer an insurance quote, or usage based insurance quote (UBI).

DETAILED DESCRIPTION

As described above, in the insurance industry, information about such factors as whether a driver of a vehicle observes safe driving habits is useful when formulating insurance quotes for a particular vehicle or driver.

To address this, described herein is a system and method for use of carbon emissions in characterizing driver performance and using such characterization to determine a profile associated with a particular insured. The profile can then be used to determine an insurance premium for the insured. In accordance with an embodiment, a driver can use a portable device equipped with a data collection and assessment environment, including one or more data collection devices that can be used to capture data and information or otherwise measure the carbon emissions associated with a vehicle. A framework (system) can use this information either to determine an insurance quote, or act as a broker/aggregator in inviting other insurance providers to offer an insurance quote, or usage based insurance quote (UBI).

Figure 1:
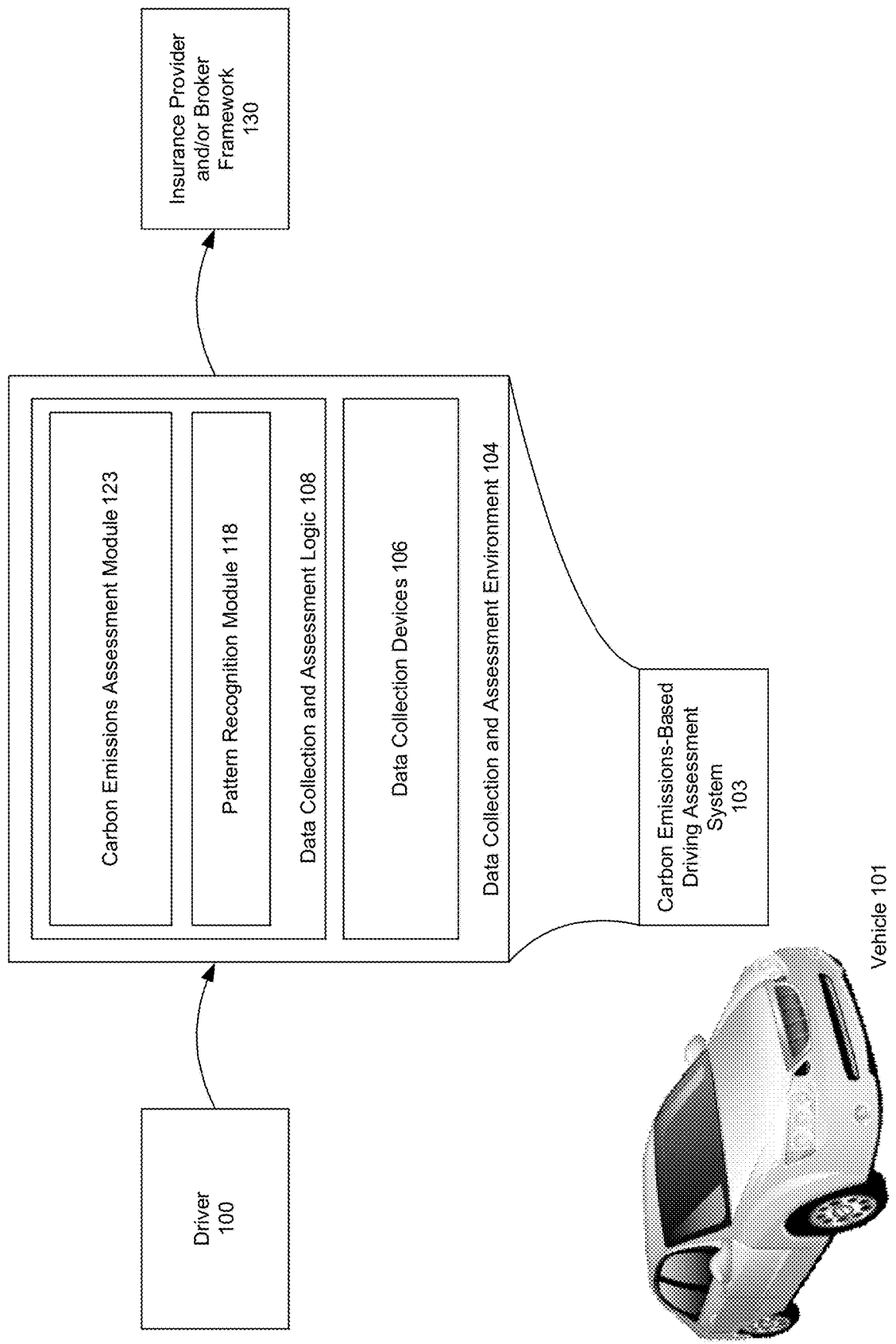
FIG. 1 illustrates a system for use of carbon emissions in characterizing driver performance and use in determining insurance coverage, in accordance with an embodiment.

FIG. 1 illustrates a system for use of carbon emissions in characterizing vehicle driver performance and use in determining insurance coverage, in accordance with an embodiment.

As described above, the amount of carbon emissions a particular vehicle generates is dependent on a variety of factors, such as the type of vehicle and its overall condition, environmental conditions, and the manner in which the vehicle is operated. For example, a vehicle driven at high speeds may generate more emissions than a vehicle driven at moderate speeds.

As shown in FIG. 1, in accordance with an embodiment, a driver 100 of a vehicle 101 can use a carbon emissions-based driving assessment system 103, which can be provided as a portable device (e.g., a smartphone, PDA, computer, or other portable device), and which is equipped with a data collection and assessment environment 104.

In accordance with an embodiment, the assessment system can itself include one or more data collection devices 106 (e.g., accelerometers, GPS, or other measurement devices) that can be used to capture data and information or otherwise measure vehicle actions, together with a data collection and assessment logic 108. A pattern recognition module 118 is configured with one or more defined operating patterns, each of which operating patterns reflects either a known change in vehicle status, or a known vehicle operating or driving behavior. For example, a vehicle responds in a physically-measurable manner to driver-based driving actions, e.g., by the driver turning the vehicle sharply at a corner. This enables the system to associate patterns with certain driving behaviors.

In accordance with an embodiment, a carbon emissions assessment module 123 includes information about typical carbon emissions, and can compare current patterns of driving with known patterns to calculate carbon emissions for a current driver/vehicle.

The resultant information can be remotely communicated to an external insurance provider and/or broker framework (system) 130, which uses the received information in comparing the calculated carbon emissions against estimated carbon emissions for similar types of vehicle, which is indicative of the driver's driving profile, and using the results in determining insurance quotes for the current vehicle/driver, or inviting other insurance providers to offer an insurance quote, or a usage based insurance quote (UBI).

In accordance with an embodiment, results from the carbon emissions assessment module can be compared with physical emission measurements in order to determine a precision built-in error. This enables certainty levels to be attached to the calculated emissions, which allow a plus/minus range and a statistical treatment of the difference between calculated emissions and manufacturer expected emissions. In turn, this can be used to associate confidence intervals with driver quality prediction scores.

In accordance with an embodiment, the system can incorporate or utilize additional functionality as further described in U.S. patent application titled "SYSTEM AND METHOD FOR USE OF PATTERN RECOGNITION IN ASSESSING OR MONITORING VEHICLE STATUS OR OPERATOR DRIVING BEHAVIOR"; application Ser. No. 13/679,722, filed Nov. 16, 2012, which claims the benefit of priority to U.S. Provisional Patent Application No. 61/578,511, filed Dec. 21, 2011, wherein incorporated by reference.

Figure 2:
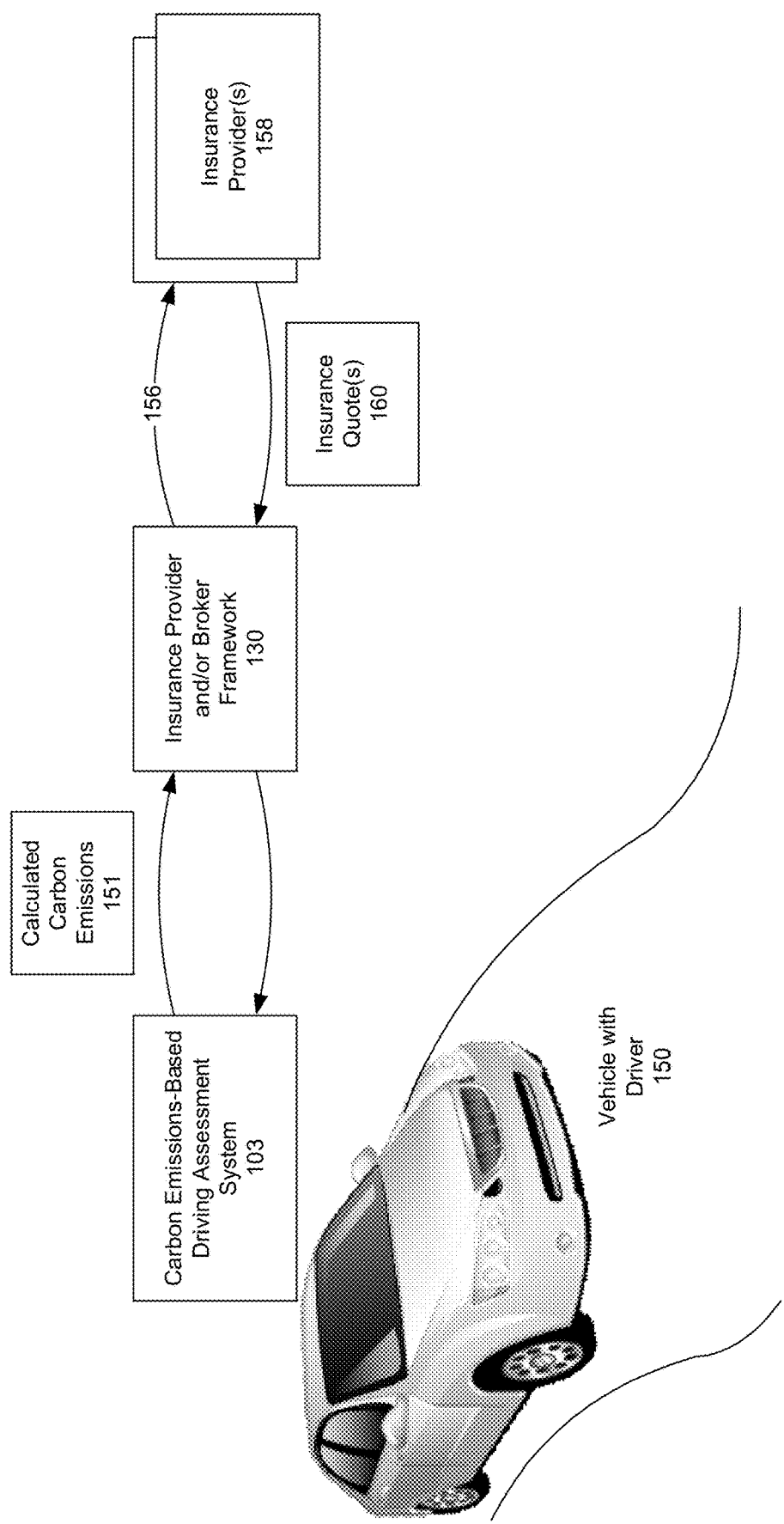
FIG. 2 illustrates use of a system for use of carbon emissions in characterizing driver performance, in accordance with an embodiment.

FIG. 2 illustrates use of a system for characterizing driver performance, in accordance with an embodiment. As shown in FIG. 2, during use, a driver of a vehicle 150 can use the carbon emissions-based driving assessment system to calculate carbon emissions for the current driver/vehicle, and to communicate 151 the information to an insurance provider and/or broker framework for use in determining an insurance quote, or act as a broker/aggregator in inviting 156 other insurance providers 158 to offer an insurance quote 160.

Figure 3:
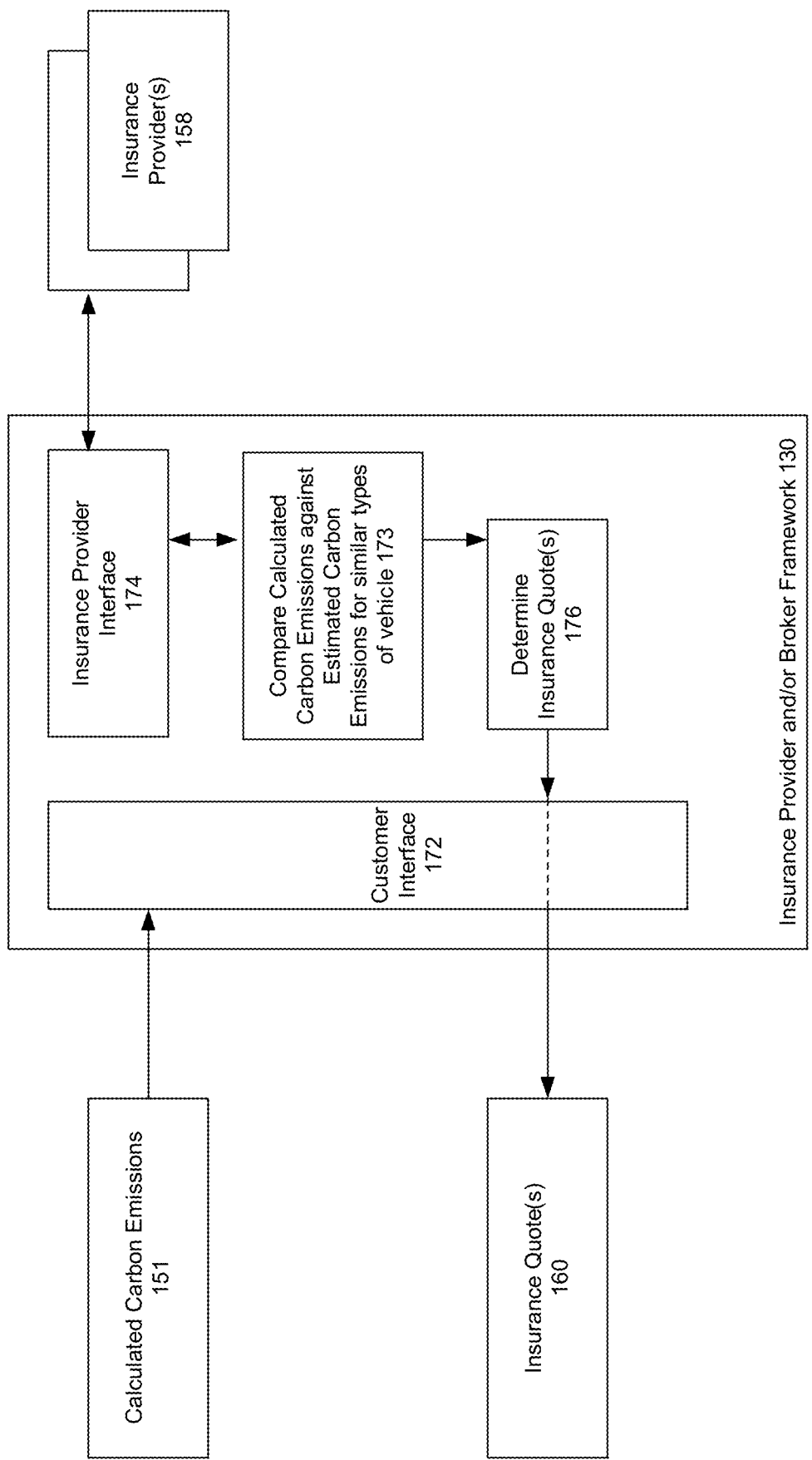
FIG. 3 illustrates use of an insurance provider and/or broker framework, in accordance with an embodiment.

FIG. 3 illustrates use of an insurance provider and/or broker framework, in accordance with an embodiment. As shown in FIG. 3, an insurance provider and/or broker framework includes a customer interface 172 that allows a driver to communicate their calculated carbon emissions, and an insurance provider interface 174 that enables the insurance provider and/or broker to invite other insurance providers to offer 176 an insurance quote personalized to the driver, based on a comparison 173 of the calculated carbon emissions against estimated carbon emissions for similar types of vehicle. The information received from the carbon emissions-based driving assessment system can be secured and/or anonymized prior to determining the driver's insurance quote, or inviting other insurance providers to offer an insurance quote.

Figure 4:
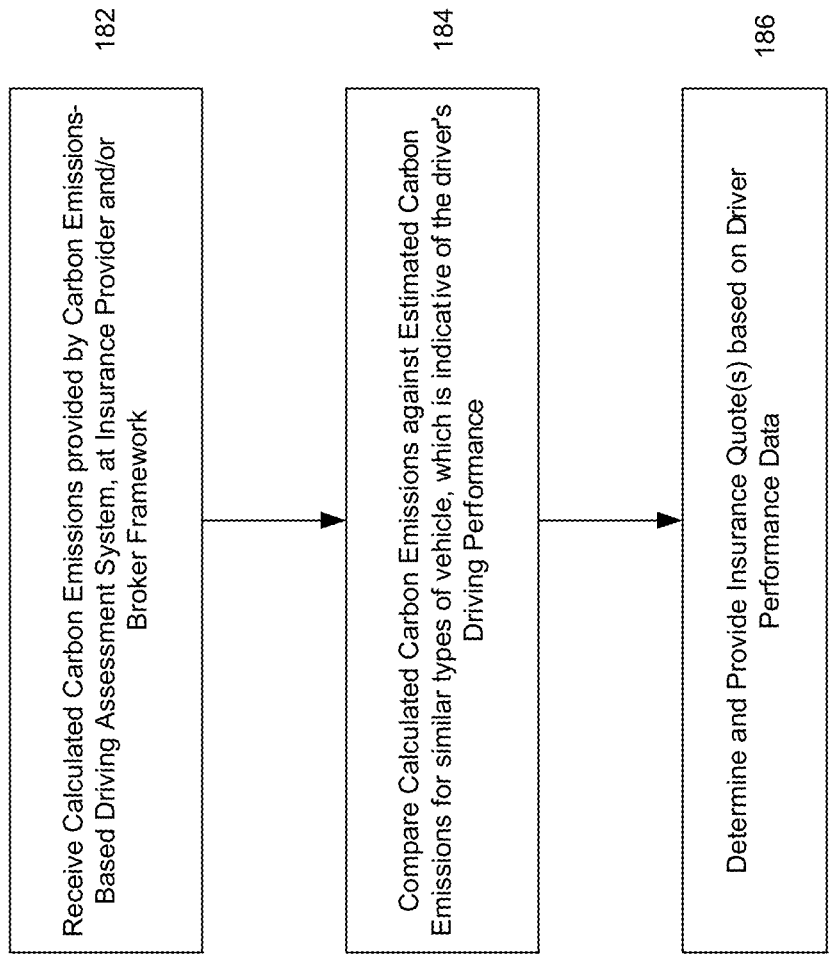
FIG. 4 is a flowchart of a method for use of carbon emissions in characterizing driver performance and use in determining insurance coverage, in accordance with an embodiment.

FIG. 4 is a flowchart of a method for use of carbon emissions in characterizing driver performance and use in determining insurance coverage, in accordance with an embodiment. As shown in FIG. 4, at step 182, the system receives calculated carbon emissions provided by the carbon emissions-based driving assessment system, at the insurance provider and/or broker framework. At step 184, the system compares calculated carbon emissions against estimated carbon emissions for similar types of vehicle, which is indicative of the driver's driving profile. At step 186, the system determines and provides insurance quote(s) based on the calculated carbon emissions for the driver/vehicle.

The present invention may be conveniently implemented using one or more conventional general purpose or specialized digital computers or microprocessors programmed according to the teachings of the present disclosure, or a portable device (e.g., a smartphone, PDA, computer or other device), equipped with a data collection and assessment environment, including one or more data collection devices (e.g., accelerometers, GPS). Appropriate software coding can readily be prepared by skilled programmers based on the teachings of the present disclosure, as will be apparent to those skilled in the software art.

In some embodiments, the present invention includes a computer program product which is a non-transitory storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. The embodiments were chosen and described in order to best explain the principles of the invention and its practical application, thereby enabling others skilled in the art to understand the invention for various embodiments and with various modifications that are suited to the particular use contemplated. For example, although the illustrations provided herein primarily describe embodiments using vehicles, it will be evident that the techniques described herein can be similarly used with, e.g., trains, ships, airplanes, containers, or other moving equipment, and with other types of data collection devices. It is intended that the scope of the invention be defined by the following claims and their equivalence.

What is claimed is:

1. A method for remotely determining vehicle driver performance for a specific vehicle and driver using acceleration measurements and estimated carbon emission patterns for a plurality of vehicle behaviors and conditions derived from said acceleration measurements, said specific vehicle being one of a defined vehicle type, the method comprising:

developing a carbon emission pattern prediction model for the vehicle type comprising:
        collecting data over time from one or more carbon emission sensors and
        one or more accelerometers from a plurality of vehicles of said vehicle type driven in a variety of manners and in a variety of conditions,
        observing patterns in the carbon emission data and the acceleration data
        for each of the plurality of vehicles driven and for each of the manners and conditions driven,
        developing statistical comparisons between the observed carbon emissions patterns and the associated acceleration patterns, and
        storing representative patterns and statistical comparisons in a remote computer memory along with identifying information for the vehicle type, driving manner and conditions for each pattern;
    identifying specific vehicle and driver carbon emission patterns for the specific vehicle and driver by:
        collecting acceleration and corresponding carbon emissions data over time for the specific vehicle while operated by the driver from one or more on-board carbon emission sensors and accelerometers;
        developing specific vehicle and driver statistical comparisons between collected acceleration and corresponding carbon emissions data for the specific vehicle and driver, and
        storing, as specific vehicle and driver acceleration patterns, the acceleration and corresponding carbon emissions data, and said specific vehicle and driver statistical comparisons in a specific vehicle on-board computer memory;
    subsequent to said identifying and on-board the specific vehicle, calculating carbon emissions for the specific vehicle and driver by:
        measuring acceleration for the specific vehicle with one or more on-board accelerometers while operated by the driver,
        comparing the acceleration measurements for the specific vehicle with the stored specific vehicle and driver acceleration patterns accessed from the on-board computer memory, and
        upon finding one or more matching acceleration patterns, querying the on-board computer memory to return one or more corresponding carbon emissions;
    transmitting the returned corresponding carbon emissions, along with identifying information for the specific vehicle and driver, to a remote user;
    comparing, at a location remote from the specific vehicle, the transmitted carbon emissions with said representative patterns and statistical comparisons stored in the remote computer memory for the vehicle type corresponding the transmitted specific vehicle identifying information; and
    assigning the driving manner for each representative pattern matching the transmitted carbon emissions as the driver performance for the specific driver corresponding to the driver identifying information.

2. The method of claim 1, wherein the identified specific vehicle and driver carbon emission patterns include an error estimation based on a value of the statistical correlation between the carbon emission pattern and the statistically correlated acceleration pattern.

3. The method of claim 1, further comprising a remote communications module configured to communicate at least one of the identified carbon emission patterns to a system external to the vehicle.

4. The method of claim 3, wherein the external system is configured to determine a usage based insurance quote based on the one or more identified carbon emission patterns, and to provide the quote to the driver.

5. The method of claim 1, wherein the specific vehicle is further provided with a display device configured to present the identified carbon emission patterns to the driver.

6. The method of claim 1, wherein acceleration measurements and identifying the specific vehicle and driver carbon emission patterns occurs in a mobile computing device residing within the target vehicle.

7. A method for remotely determining vehicle driver performance for a specific vehicle and driver using acceleration measurements and estimated carbon emission patterns for a plurality of vehicle behaviors and conditions derived from said acceleration measurements, said specific vehicle being one of a defined vehicle type, the method comprising:

developing a carbon emission pattern prediction model for the vehicle type comprising:
        collecting data over time from one or more carbon emission sensors and
        one or more accelerometers from a plurality of vehicles of said vehicle type driven in a variety of manners and in a variety of conditions,
        observing patterns in the carbon emission data and the acceleration data for each of the plurality of vehicles driven and for each of the manners and conditions driven,
        developing statistical comparisons between the observed carbon emissions patterns and the associated acceleration patterns, and
        storing representative patterns and statistical comparisons in a remote computer memory along with identifying information for the vehicle type, driving manner and conditions for each pattern;
    identifying specific vehicle and driver carbon emission patterns for the specific vehicle and driver by collecting carbon emissions data for the specific vehicle while operated by the driver from one or more on-board carbon emission sensors;
    transmitting identified carbon emissions patterns, along with identifying information for the specific vehicle and driver, to a remote user;
    comparing, at a location remote from the specific vehicle, the transmitted carbon emissions pattern with said representative patterns and statistical comparisons stored in the remote computer memory for the vehicle type corresponding the transmitted specific vehicle identifying information; and
    assigning the driving manner for each representative pattern matching the transmitted carbon emissions pattern as the driver performance for the specific driver corresponding to the driver identifying information.

\* \* \* \* \*